(12) United States Patent
Shiban (10) Patent No.: US 8,522,707 B1
(45) Date of Patent: Sep. 3, 2013

(54) OIL SPILL AND HURRICANE FIGHTING SYSTEM

(75) Inventor: Samir S. Shiban, Chandler, AZ (US)

(73) Assignee: Innovative Engineering Solutions, Inc., Chandler, AZ (US)

( * ) Notice: Subject to any disclaimer, the term of this patent is extended or adjusted under 35 U.S.C. 154(b) by 510 days.

(21) Appl. No.: 12/802,836

(22) Filed: Jun. 15, 2010

Related U.S. Application Data (60) Provisional application No. 61/274,701, filed on Aug. 20, 2009.

(51) Int. Cl.
*B63B 35/44* (2006.01)

(52) U.S. Cl.
USPC ............ 114/267; 114/263; 114/266; 405/219

(58) Field of Classification Search
USPC ......... 114/263, 264, 265, 266, 267; 405/218, 405/219, 221
See application file for complete search history.

(56) References Cited

U.S. PATENT DOCUMENTS

| | | | | |
|---|---|---|---|---|
| 4,838,735 A | * | 6/1989 | Warner | 114/267 |
| 5,297,899 A | * | 3/1994 | Culley | 114/267 |

* cited by examiner

*Primary Examiner* — Lars A Olson
(74) *Attorney, Agent, or Firm* — James Creighton Wray (57) ABSTRACT

A three dimensional floating structure is formed of interconnected sealed pipes. Large tires are filled with foam, sealed and arranged side by side on the lowest horizontal pipes. A deck supports activities. Structures on sides at a water surface trap floating substances. Offset hinged plates connect modules, forming large structures. Wind redirectors are mounted on plural levels. Windmill pumps draw cool deep water and spray water to disrupt wind energy, cool the surface and concentrate floating substances. The windmills drive turbine generators directly by pumping water to storage tanks and discharging the water through penstocks to drive hydro-electric turbine generators. Excess power is transmitted through cables to onshore power grids. The floating structures provide oil recovery and wind de-energizing, water and waste treatment and residential and recreational activities.

31 Claims, 15 Drawing Sheets

FIG. 9
WATER FLOW DIAGRAM

ASSEMBLY OF HURRICANE AND OIL SPILL CONTROL MODULES

FIG. 13

THOUSANDS OF INDIVIDUAL MODULES ARE [EXAMPLE 16' X 16' X 4' H]. CONNECTED TOGETHER VIA DIAMOND STEEL PLATES AND TRAIN STYLE HITCHES. THEY CAN FORM A MASSIVE STRUCTURE WITH A RELATIVELY HUGE SURFACE AREA TO FIGHT HURRICANE FORCE. IN ADDITION A SINGLE LINE "AT A TIME" CAN BE DISCONNECTED TO FORM A LONG WALL 4' H X 16' WIDE AND SEVERAL THOUSAND FEET LONG. A THICK TARP CAN BE EMPLOYED TO TRAP OIL SPILL AND PUMP IT TO BARGES. THICK BLANKETS OF HAY OR OTHER ABSORBENT MATERIAL CAN BE DRAPED OVER THE 4' HIGH LONG WALL TO ABSORB OIL FROM THE WATER. PUMPS AND TANKS CAN BE MOUNTED ON THE FLOAT TO RECOVER OIL COLLECTED ON THE SURFACE OF THE WATER.

OIL SPILL AND HURRICANE FIGHTING SYSTEM

This application claims the benefit of U.S. Provisional Application No. 61/274,701, filed Aug. 20, 2009, which is hereby incorporated by reference in its entirety.

SUMMARY OF THE INVENTION

Hurricanes, oil spills typhoons and cyclones cause major disasters of human suffering and significant property damage. Oil spills are difficult to restrict in high winds and rough seas. Hurricanes derive their power largely from heat energy at warm surface temperatures and form large circulating patterns with high wind speeds.

This invention provides oil spill restriction and partial separation between a hurricane and its main source of energy, warm ocean surfaces. The invention also uses part of the wind power to restrict oil spill damage and to reduce the power of a cyclone, typhoon or hurricane and to disrupt its rotating pattern. Hurricanes are used in the discussion of the invention, although other high energy, high wind speed storms such as cyclones and typhoons are inferred.

This invention places a massive man made structure in the path of the oil spill restricting its spreading and in the path of the hurricane, thereby separating it partially from its source of energy. The structure is equipped with air foils to reflect and redirect the wind in opposite directions or in a direction to concentrate an oil spill. Wind powered water pumps pump cold water, which is sprayed against the wind direction. The water is discharged through nozzles on rotating couplings. The nozzles are attached to and directed by rudders.

The floating structure is sufficiently large to have an impact on oil recovery and storm fighting and is small enough to be movable. Several module structures used together in assemblies have significant impact on oil spills and hurricanes. Suggested dimensions are 1.5 miles across or 1.5 mile long by ½ mile wide and 40 feet high. Dimensions for octagon embodiments are 1 mile in diameter and 40 feet high.

One embodiment of this invention has thousands of discarded tires filled with buoyant material and attached together and stacked and bound to form a buoyant base of the structure. Each tire is filled with water resistant foam material to enhance buoyancy. The tires are dipped in wax or coated with a salt water resistant chemical such as PVC or Teflon for longer service.

Pumps draw cold water from 6 feet or more below the ocean surface. Rotating nozzles are controlled with rudders to discharge water against the direction of the wind.

Air foils reflect and redirect wind power and disrupt hurricane patterns. The invention separates a hurricane from its power source by placing a massive man made floating structure between the hurricane and the warm ocean waters.

The main purpose of a new hurricane fighting machine is to separate the hurricane from the energy source, using the hurricane's power against itself to disrupt the flow pattern, and to minimize the impact of the hurricane on shoreline and adjacent communities.

Computer modeling is used to test every component of the island assembly and is applied to the island as a whole filled to capacity. Tests are conducted under category 5 hurricane force conditions.

The goals are to reduce oil spill and hurricane impact on shore lines, water ways and adjacent communities, and to create a clean energy-generating entertainment island that is energy self-sufficient, and to utilize discarded tires as a main buoyant construction material.

A propulsion system uses water flow generated by the windmill driven pumps and diverted to underwater jet nozzles to move the assemblies which are also referred to as islands. Thousands of nozzles are permanently mounted perpendicular to the sides of an octagon. They can be deployed selectively to propel the floating assembly in the opposite direction from the nozzle discharge.

Under normal weather conditions the floating assembly is not capable of propelling itself in any direction and must be moved to the anticipated path of an oil spill, cyclone, typhoon or hurricane. Under high wind conditions the windmill pumps convert the wind power into high pressure water flow. Under water nozzles are placed around the perimeter of the entire structure which can be selectively utilized to move the floating island in the desired direction.

A control room located within the structure monitors and operates the system and communicates its status. Trained operators man the control room.

All island structures of the system above water levels are equipped with fire protection sprinkler systems made of non combustible materials, which meet or exceed all applicable codes and standards for floating structures.

For oil spill mitigation, a long line of modules is used as a mobile berm and strategically placed between offshore oil drilling rigs and fragile shore lines. The mobile berm long line of modules is ready to use in case of a spill or wind storms. A back up line of modules can also be added to protect highly sensitive or economically valuable areas.

These and further and other objects and features of the invention are apparent in the disclosure, which include the above and ongoing written specification, with the claims and the drawings.

DETAILED DESCRIPTION OF THE DRAWINGS

FIGS. 1, 1A, 2 and 3 show a hurricane, oil spill, cyclone and typhoon fighting island system 10 formed in an octagonal shape. Island 10 has a base 20 formed of columns 22 at corners 24 and horizontal and angular connectors 26 which hold buoyant material filled and coated discarded tires 28.

Lower deck 30 has a series of cold water pumping systems 40 with submerged intakes 42 and above or below deck water pumps 44 and wind vane drives 46. The water outlets 48 are connected through pipes in, on or below deck 30 and in or on deck supporting columns 50 and horizontal pipes; and horizontal support pipes, which extend radially across the structure of the system 10.

Spray nozzle assemblies 60 are positioned peripherally on top deck 70 and middle decks 80 and 90. Middle decks 80 and 90 and lower deck 30 have side-by-side mounted semi spherical air foils 100 which redirect wind forces to away from standard storm directions to interrupt wind patterns which would otherwise tend to strengthen storms.

The upper deck 70 is equipped with side-by-side semi cylindrical wind deflectors 110, which redirect wind forces to away from or opposed to standard wind directions of storms to interrupt wind patterns that would otherwise tend to strengthen the storms.

The upper deck semi cylindrical wind deflectors 110 also cooperate with the centered spray nozzle rudders 60 to direct cool water spray into the wind and to reverse the effect of warm ocean surface water on storm strengthening. Anchors 68 hold the island in place. Generators 192 provide power. An island access and boat dock 69 is connected to the upper deck 70. The upper deck 70 also has a walking track 67, a helipad 71, a casino 72, a hotel 73, water holding tanks 74, solar panels 75, control rooms 77, a desalination plant 78 and a sewage treatment plant 79.

As shown in FIGS. 1-4, the bowl-shaped semi spherical wind redirectors 100 are about 8 feet or more in diameter and are made of high strength material such as PVC about ½ inch thick.

Semi cylindrical wind redirectors 110 on the upper deck 70 have diameters of about 8 feet or more and heights of about 10 feet or more. The wind redirectors 100 and 110 are supported peripherally by joining to adjacent redirectors and to the decks. Trusses at the rear of the wind reflectors and redirectors 100, 110 provide further support.

Figure 1:
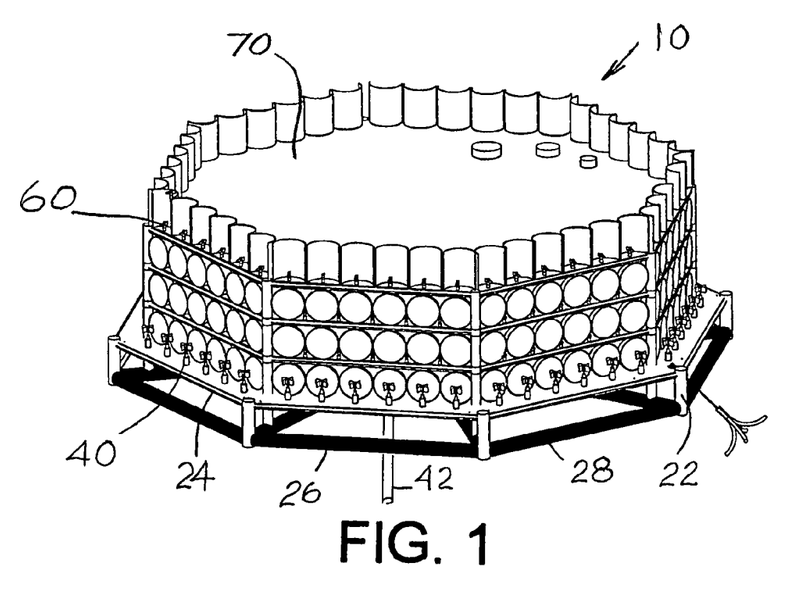
FIGS. 1 and 1A are a perspective top and side views of octagonal or multiple sided oil spill and hurricane fighting islands.
Figure 1A:
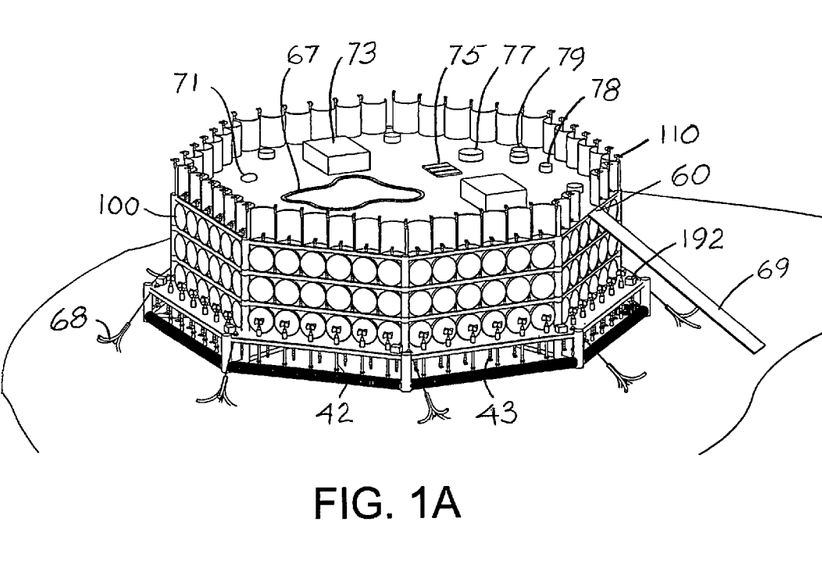
Figure 2:
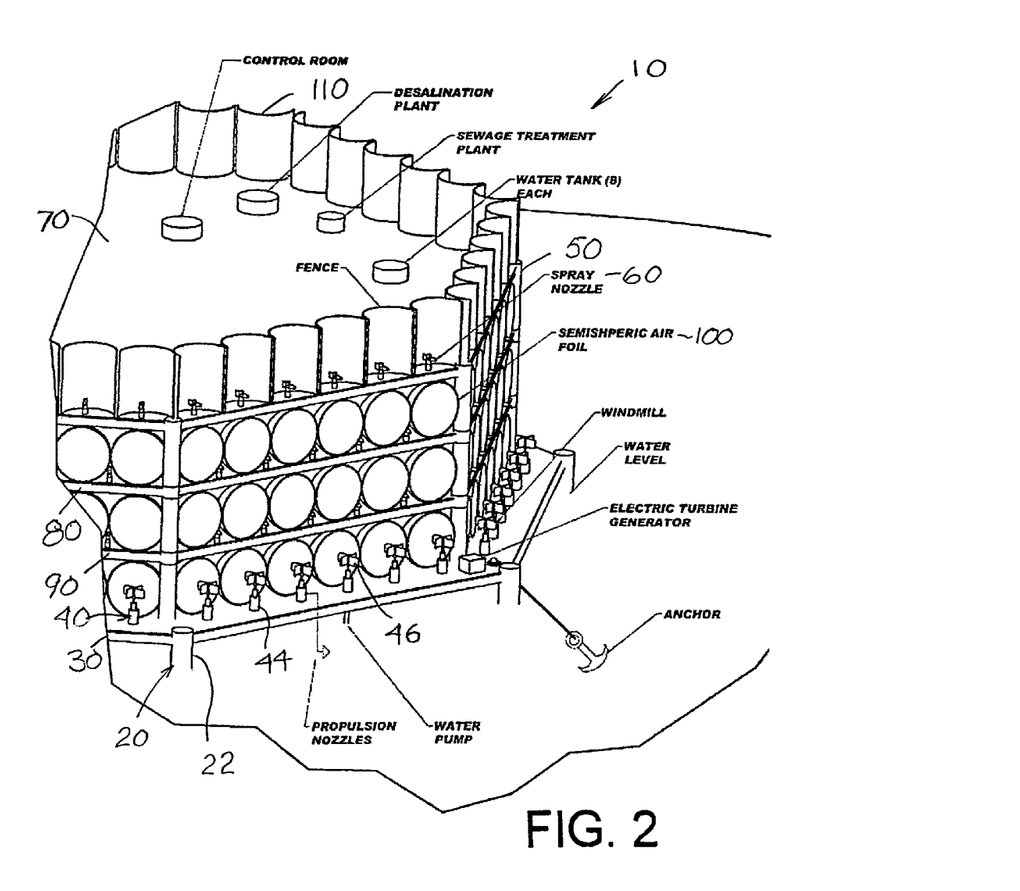
FIG. 2 is a perspective top and side detail of elements in the island.
Figure 3:
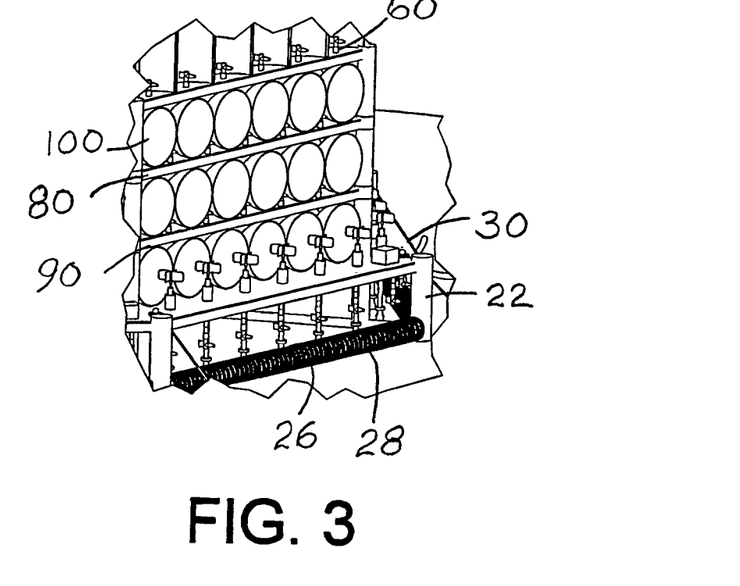
FIG. 3 is a detail of semi spherical deflectors, wind driven pumps, rudder directed spray nozzles and buoyant support structure of the island.
Figure 4:
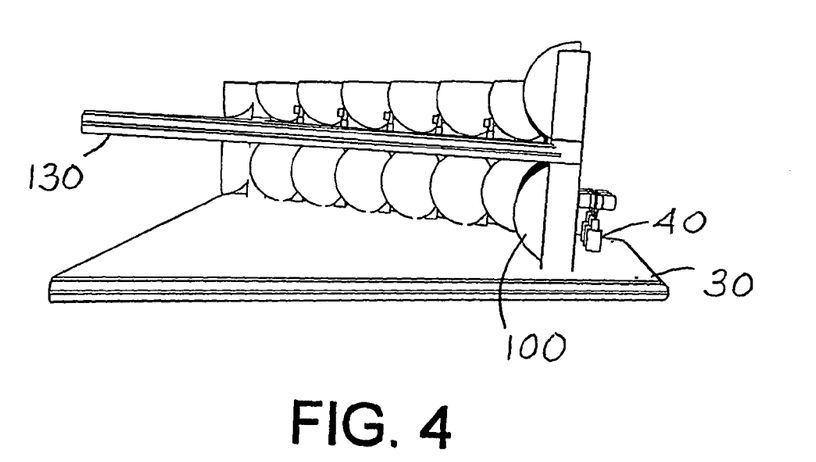
FIG. 4 is an inside middle deck perspective detail showing insides of the semi spherical air foils and the galvanized steel sprinkler piping.

FIG. 4 shows the inner sides of semi spherical wind reflectors 100, middle deck 80 vertical columns 50 and galvanized steel fire suppressing sprinkler piping 130.

Figure 5:
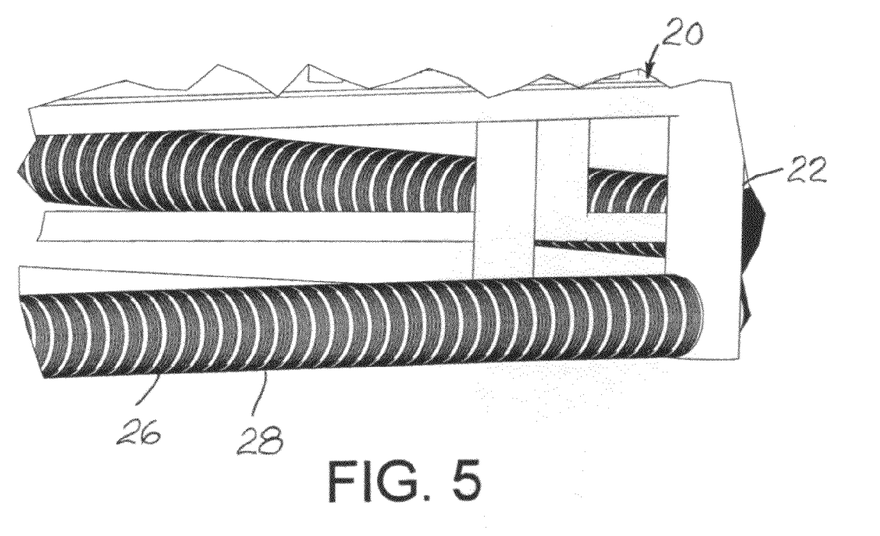
FIG. 5 is a perspective detail of the buoyant support structure.

FIG. 5 shows buoyant material filled tires mounted on buoyant horizontal hollow sealed paper structures 140 and on the buoyant horizontal hollow sealed outer vertical columns 22.

Pumps 40 on the lower deck 30 have submerged intakes 42 and conduits which extend 10 to 15 or more feet down into the water to suction water at cool, below surface temperatures. To relocate the oil spill and storm fighting island system 10, water from the pumps 40 is valved and redirected to under water turntable jets 43.

Figure 6:
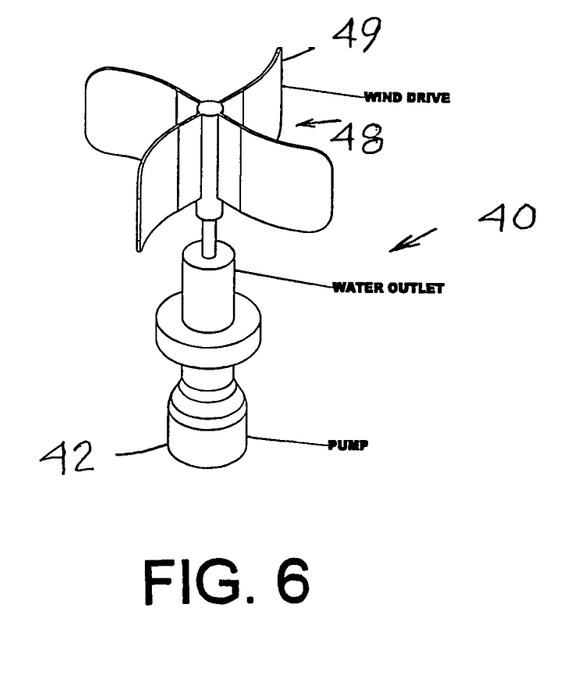
FIG. 6 is a detail of water pump showering FIGS. 1-3.

The intakes of the pumps 40 shown in FIG. 6 are placed 10-15 feet below water level. The pumps 40 are able to run on variable RPM and mechanically are connected to wind drives. Pumps 40 are located all around the lower deck 30.

The wind drives 48 have tough curved blades 49 which drive the pumps at variable wind speeds.

Figure 7:
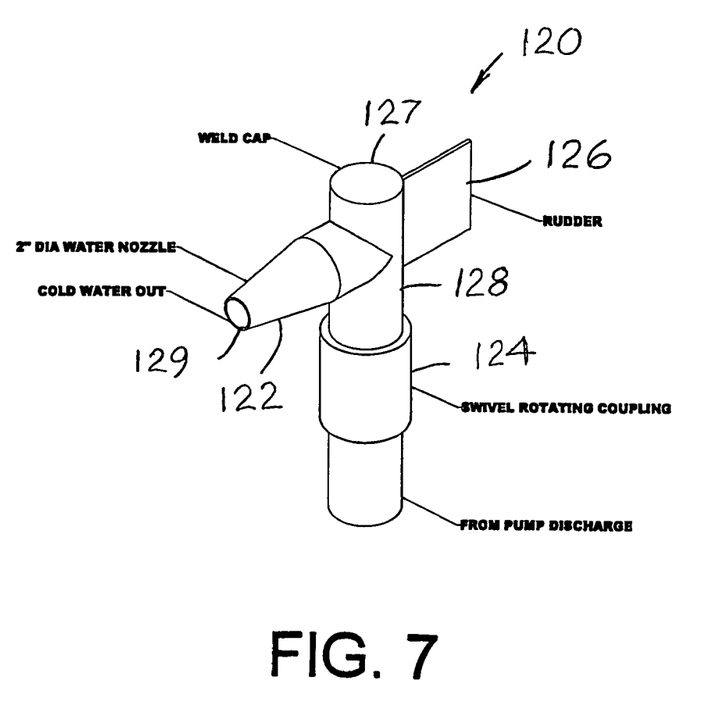
FIG. 7 is a detail of spray nozzles showering FIGS. 1-3.

The spray nozzle assemblies 120 shown in FIG. 7 have nozzles 122 mounted on rotating couplings 124, which are off the shelf items for 4 inch diameter pipes and allow the nozzles to rotate 360 degrees. Each nozzle assembly 120 has a ¼ inch thick galvanized steel rudder 126, 2 feet long by 2 feet high, which is welded to the pipe 128 opposite nozzle 122. Pipe 128 is closed by a welded cap 127. Rudders 126 position nozzles 122 directly against the wind direction. Each nozzle 122 is a 4 inch diameter to 2 inch diameter reducer welded to a 4 inch diameter pipe 128. Water flow is reduced by nozzle 122 to a 2 inch outlet 129 to discharge cold water.

Figure 8:
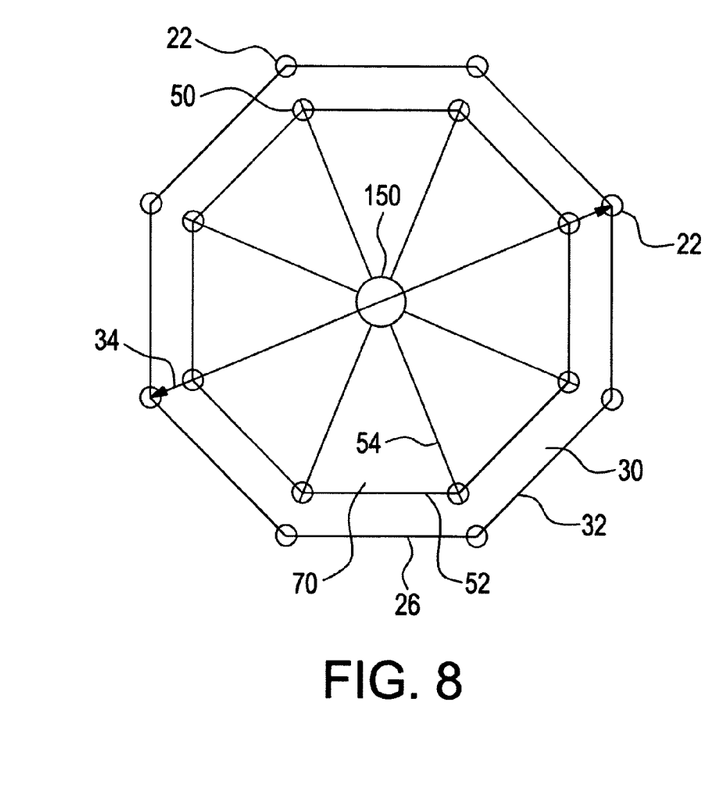
FIG. 8 is a schematic plan view of support columns and horizontal supporters.

FIG. 8 is a schematic plan view of support columns and horizontal supports.

As shown in FIGS. 1, 3, 5 and 8 hollow, capped and sealed 4 inch thick PVC outer columns 22 are 8 feet in diameter and 10 feet high. Outer columns 22 are joined by hollow capped and sealed horizontal peripheral and radial connectors 26 which hold aligned buoyant material filled with discarded tires 28. Lower deck 30 and peripheral and radial 8 foot diameter 4 inch thick support pipes 32, 34 are connected to columns 22, 150 and 50.

A central column 150 extends between the upper deck and the buoyant radial connectors. The central column is 30 feet in diameter and 50 feet high and has walls of 12 inch thick PVC. The hollow central column 150 is capped and sealed to maintain water tight connections.

Columns 50 extend from the lower deck to the upper deck 70, and have 4 inch thick PVC walls and 8 foot diameters. Peripheral and radial horizontal supports 52, 54 for middle decks 80 and 90 have 8; diameters and 4 inch thick walls. All supports are capped and sealed against water ingress.

Figure 8A:
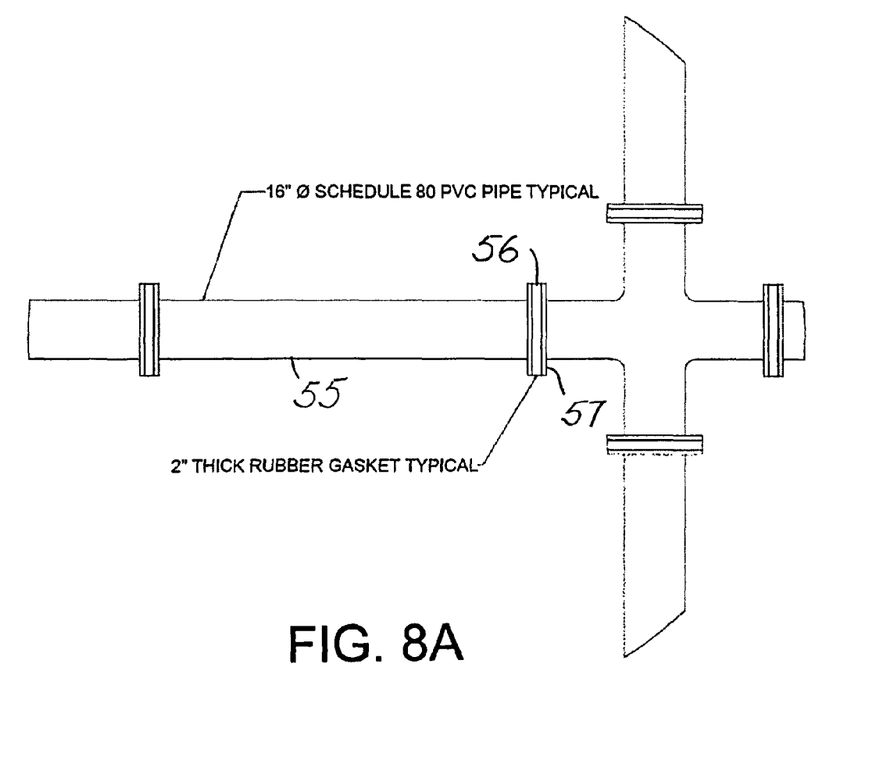
FIG. 8A is a schematic plan view of PVC pipe connections with gaskets to absorb shock and stress.

As shown in FIG. 8A, 16 inch diameter schedule 80 PVC pipes 55 have 2 inch thick rubber gaskets 56 between flanges 57 on the ends of the pipes.

Figure 9:
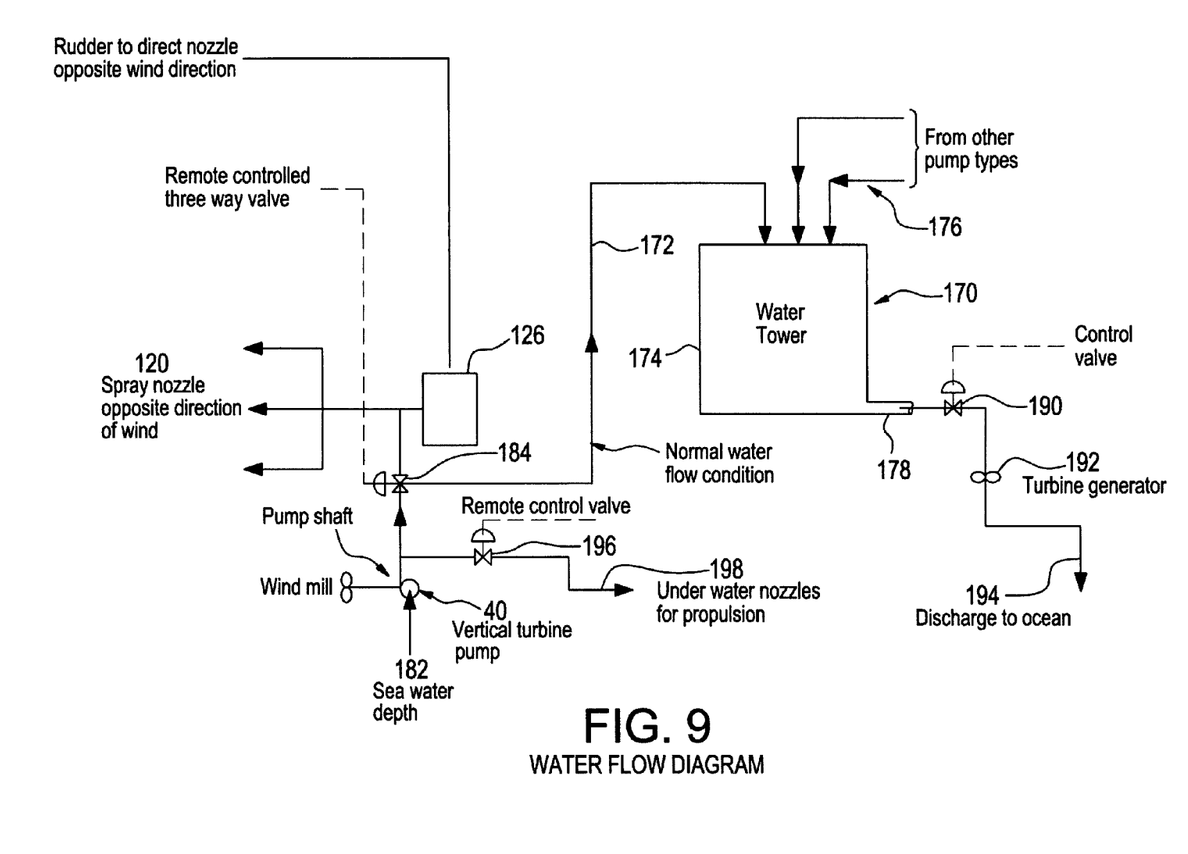
FIG. 9 is a schematic detail of water flow.

As shown in FIG. 9, when the island 10 is not fighting oil spills or hurricanes, the vertical wind driven turbine pumps 40 are used to generate power for supply to shore based utilities or platforms through underwater cables.

Sea water 182 from about 15 feet below the surface is pumped through a remote controlled three way valve 184 to the oil spill and hurricane fighting spray nozzles 120, to underwater propulsion jets or to a power generation system 170. In the latter condition, which operates most of the year, water is pumped through line 172 to a large capacity water tower 174. Tower 174 may also receive water from other pumping systems and pump types 176. Water flows through outlet 178 and control valve 190 to a turbine generator 192 and then to a discharge 194 to the ocean.

Remote control valve 196 is opened to direct flow from the pumps 40 to underwater jet nozzles 198 for propulsion of the oil spill and storm fighting island system 10 to new locations.

Figure 10:
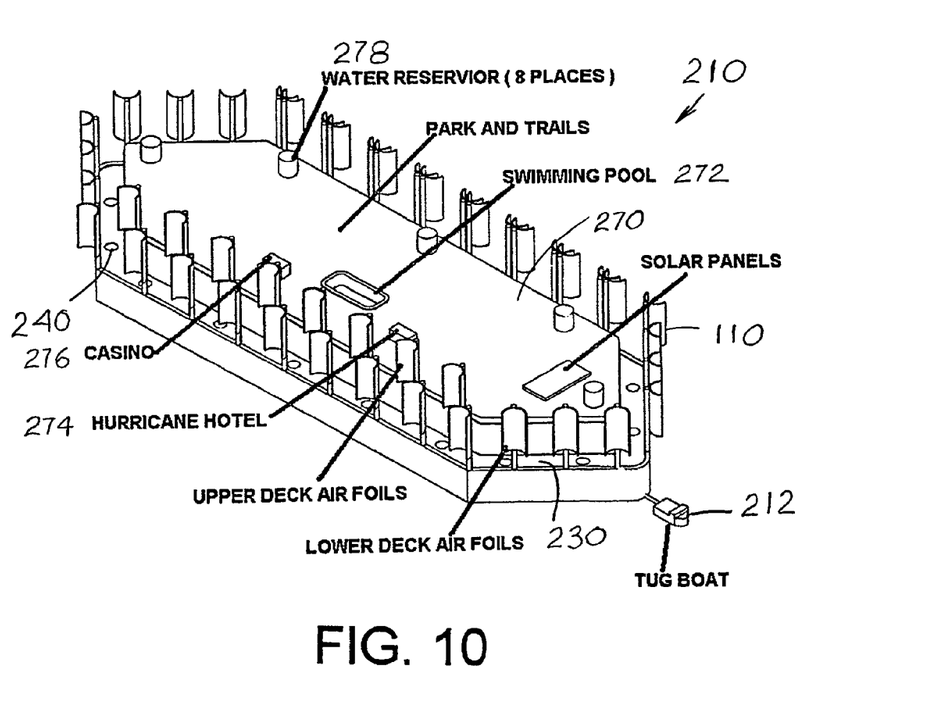
FIG. 10 is a top, front and side perspective of an alternate island foundation.
Figure 11:
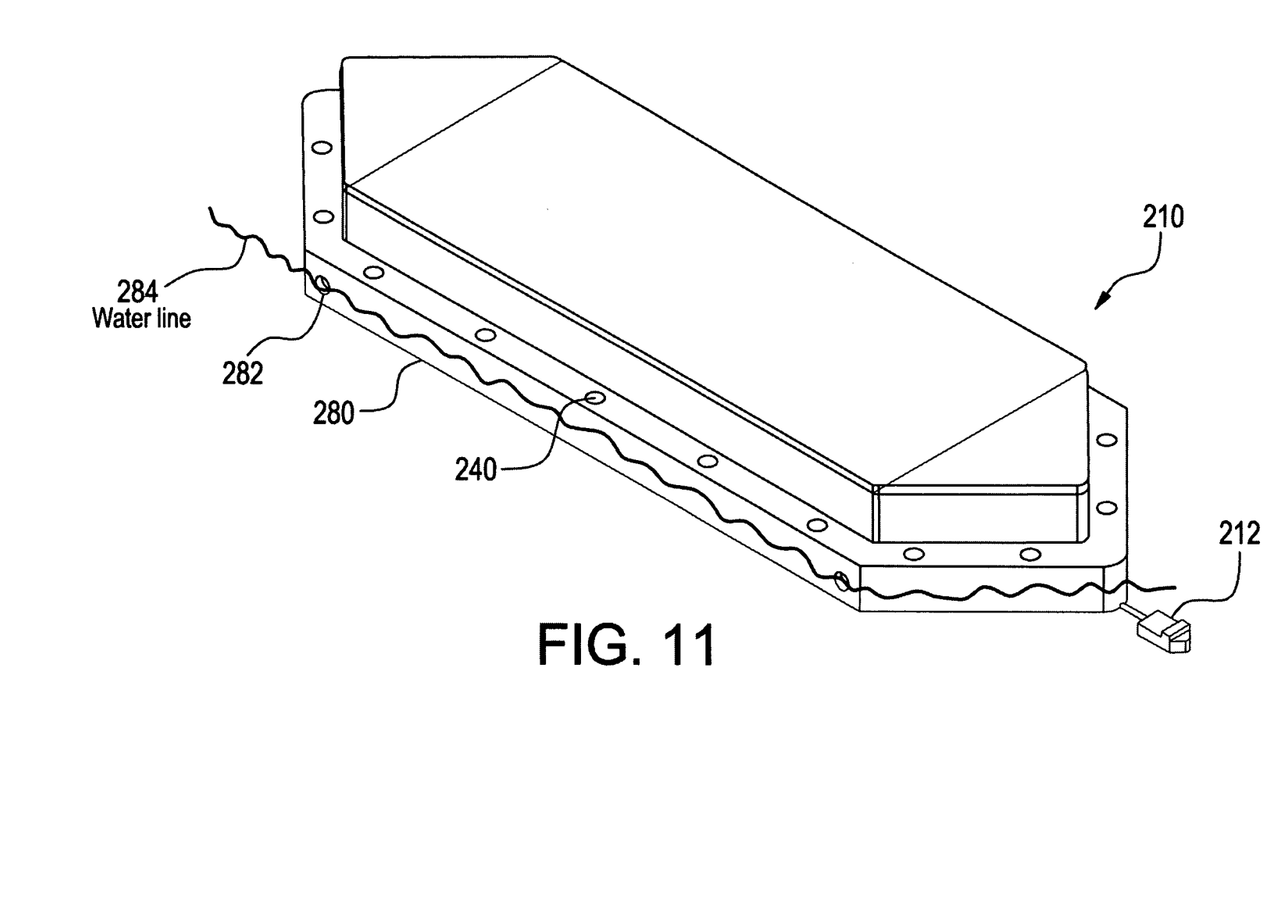
FIG. 11 is a detail of wind deflecting foils on the island shown in FIG. 7.

An alternate oil spill and storm fighting island system 210 shown in FIGS. 10 and 11 has an elongated shape for example a mile and a half long. Tug boat 212 tows the island system 210 into desired position.

Two or more decks hold semi cylindrical wind deflectors and reverses 110. Pumps 40 are mounted on the lower deck 230 to pump water sprays into the wind from rudder-directed nozzles as previously described. In addition to or in place of tug boat 212, pumps 40 may supply turntable underwater jet nozzles to propel the island system to new positions.

As shown in FIG. 10, 8 foot diameter wind directors 110 on the upper deck 270 are spaced on 8 foot centers offset from similar directors 110 on lower deck 230. Wind driven pumps 40 are mounted on lower deck 230 at pump stations 240.

The upper deck 270 is provided with recreational parks, trails and a swimming pool 272, a hotel 274 and a casino 276. Water reservoirs 278 are placed around the upper deck.

As shown in FIG. 11, the lower deck 230 is mounted on hull 280. The hull is galvanized and powder coated on shell bottom and borders, a minimum of ¼ inch thick. Floating support base dimensions are 1 mile long and ¼ mile wide, 5 feet tall. Upper deck dimensions are 40 feet smaller than lower deck dimensions. A steel reinforced concrete foundation 12 inches thick covers the entire foundation. Anchor stations 282 are provided at four places along water line 284. Pump stations 240 are provided around the lower deck. The foundation and all decks may be made of interconnecting structural tubes and foam filled discarded tires.

Figures 12, 12A:
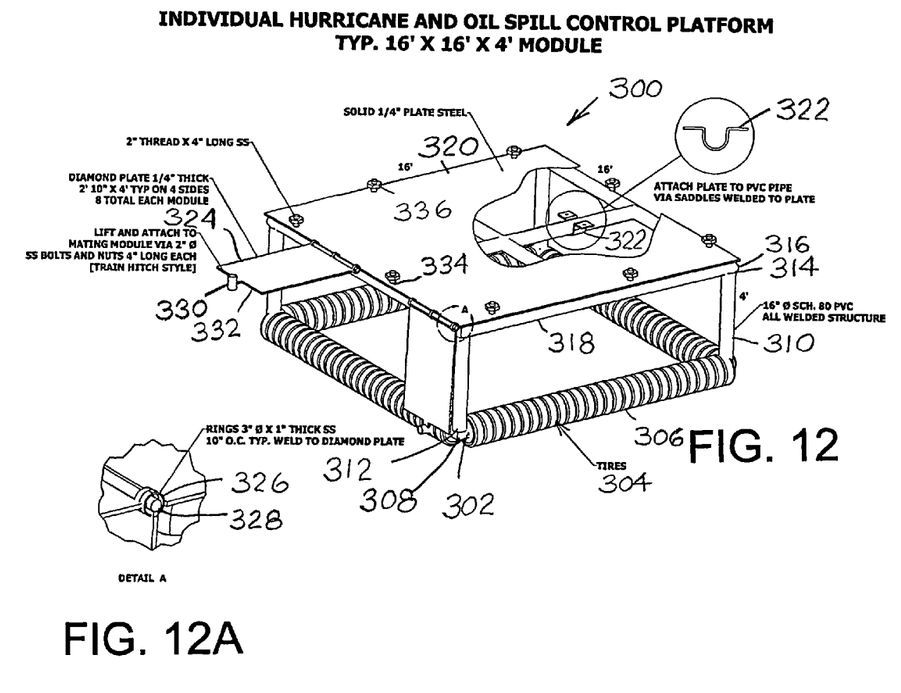
FIG. 12 is a schematic perspective view of elements of an island.
FIG. 12A is a detail of rods, rings and forming hinges for the mating modules.
Figure 13:
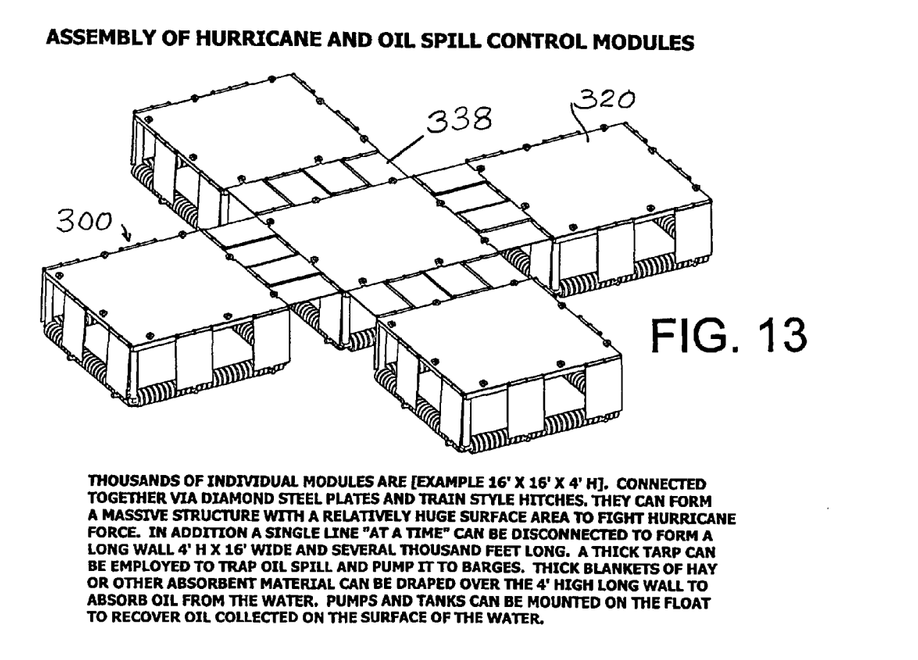
FIG. 13 is a perspective view of several interconnected modules.

FIGS. 12-13 show modules 300 for joining together to form massive floating islands for hurricane modulation and oil recovery.

Modules 300 have hollow sealed lower horizontal support members 302 which are joined together after stringing assemblies 304 of used large tires 306 on the members 302. The tires 306 are filled with buoyant foam material and sealed before they are placed side by side on the horizontal members 302. The members are connected to each other at ends 308. Vertical hollow structural members 310 have lower ends 312 connected to the joined ends 308 of the horizontal members 302. The vertical members 310 are joined at upper ends 314 at corners 316 of interconnected upper horizontal members 318.

Deck plate 320 is supported on top of the joined upper horizontal members 318 and welded cross members 319. All members 302, 310, 318 and 319 are hollow and sealed for buoyancy. The members may be filled with stereotactic foam to ensure against flooding if damaged.

The deck plates 320 are connected to the upper horizontal members 318, 319 by saddle straps 322 circling below the members 318, 319 and welded to the deck plates.

Connecting plates 324 have rings 326 welded at upper ends that are hinged on rods 328 welded to and offset from the edges of deck plates 20. The connecting plates 324 have cylindrical connectors 330 mounted on centers of edges 332 remote from the hinges.

Bolts 334 extend vertically from edges of the deck plates 320. The bolts receive the cylindrical connectors 330, and nuts 336 lock the connectors on the bolts, joining two or multiple modules 300 to each other, as shown in FIG. 13.

Opposite connecting plates 324 and pipes 328 are laterally offset so that adjacent plates extending oppositely between the modules form a continuous interconnecting deck 338.

The interconnected modules may be used as a floating oil concentrator. A string of modules 300 are interconnected with connecting plates 324 and interconnecting bolts. The modules when not loaded float with the side-by-side tires 306 partially submerged. Floating oil cannot pass the 306 in calm seas and is ready to be recovered from the concentration caused by the tires. Boards, boom or tarps may be connected to the modules to form a continuous barrier to passage of floating oil. In heavier seas, oil lifted over the tires, boards, booms or tarps by waves is entrapped in the middle of the module for recovery. In exceptionally strong seas, two or more ranks of the modules 300 may be joined together so that oil washing out of one module is trapped between parallel modules and is further trapped within the modules in the second parallel rank. Recovery scoops, rollers, lifters and pumps may be mounted on some or all modules. When the modules are heavily laden, floating booms or other barriers may be supported between the vertical members 310.

The modules 300 may be interconnected and used to support the hurricane fighting structure shown in FIGS. 1-11.

When the floating island is arranged from multiple modules 300, exterior sides of exterior modules may draw the connecting plates upward and use them as wind deflecting plates. Connecting plates may be arranged side by side along the exterior faces of the exterior modules. The raised connecting plates are concave to redirect the wind.

Thousands of individual modules are, for example 16'×16'×4' high, are connected together via diamond steel plates and train style hitches. The connected modules form a massive structure with huge surface area to fight hurricane force. In addition, a single line at a time can be disconnected and the lines 5 can be reconnected end to end to form a long wall 4 feet high×16 feet wide and several thousand feet long. A thick tarp can be employed to trap oil spill and pump it to barges. Thick blankets of hay or other absorbent material and be draped over the 4 feet high long wall to absorb oil from the water.

Train hook-ups of hurricane and oil spill fighting module platforms are shown in FIG. 13. Modules are for example 16'×16'×4'. The deck plates are attached to the PVC pipes using U-shaped saddles welded to the bottoms of the plates. In an example, the frame is formed of 16" schedule 80 PC pipes in an all welded structure. Foam filled sealed and coated tires are mounted side by side on the lower horizontal pipes, adding buoyancy, ruggedness and ballast to the modules. Vertical pipes, top pipes and cross pipes are welded beneath the deck.

The interconnecting plates are mounted on rings 3 inches×1 inch thick stainless steel are welded on ten inch centers to the diamond deck plate. Eight 2 inch diameter stainless steel bolts 4 inches long are welded on edges of the deck plates. Four feet long diamond steel plates ¼ inch thick and 2 feet 10 inches×4 feet, two each on four sides or eight plates are hinged on each module. The interconnecting plates are lifted and the couplers on remote edges of the plate are connected on the mating module via 2" diameter stainless steel bolts and are welded with nuts.

While the invention has been described with reference to specific embodiments, modifications and variations of the invention may be constructed without departing from the scope of the invention, which is defined in the following claims.

I claim:

1. Apparatus comprising floating structure modules, further comprising sealed and interconnected structural lower, intermediate and upper pipes, foam filled and sealed buoyant elements connected to lower sealed pipes in the floating structure modules and decks connected to upper pipes and module interconnecting plates joined edges of deck plates on adjacent modules for interconnecting the modules, wherein the interconnecting plates are hinged from hinges along peripheral edges of the deck plates of the modules, and further comprising first connectors on the ends of the interconnecting plates remote from the hinges, and second connectors on the deck plates spaced between the hinges for connecting to the first connectors on the ends of the interconnecting plates of adjacent modules for forming an assembly of modules.

2. The apparatus of claim 1, wherein the plates connected to adjacent modules are alternated and interleaved and the interconnecting plates and the decks of the modules in the assembly form a continuous deck.

3. The apparatus of claim 1, further comprising water level barriers connected to the structural pipes near a water line.

4. The apparatus of claim 3, further comprising collecting and pumping equipment on the modules for recovery of floating material outside or inside of the barriers.

5. The apparatus of claim 3, wherein the interconnecting plates that are peripheral plates on the assembly of modules are used in the recovery of oil or other floating material.

6. The apparatus of claim 5, wherein the peripheral plates are curved and are raised and held above the decks as wind deflectors.

7. The apparatus of claim 2, wherein the peripheral plates are curved and are raised and held above the decks as wind deflectors.

8. The apparatus of claim 1, further comprising:
   wind redirectors mounted on the assembly of modules, windmills on the assembly of modules, water pumps mounted on the assembly of modules and connected to the windmills, submerged deep water intakes connected to the water pumps, and directional water nozzles connected to the water pumps.

9. The apparatus of claim 8, further comprising generators connected to the windmills generating electricity.

10. The apparatus of claim 8, wherein the nozzles are spraying nozzles.

11. The apparatus of claim 8, further comprising water pipes extending from swivels on the base, rotatable tops mounted on the swivels and wind directed fins mounted on the rotatable tops to rotate the tops, and wherein the nozzles are mounted on the tops for directing water in directions controlled by the fins and rotatable tops.

12. The apparatus of claim 11, wherein the nozzles are mounted on the rotatable tops directly opposite the fins.

13. The apparatus of claim 12, wherein the floating module assembly has plural levels, and the windmills and pumps are mounted at lower levels and the swivel fins and nozzles are mounted at higher levels.

14. The apparatus of claim 8, wherein the module assembly has plural levels and the wind redirectors are mounted at the plural levels.

15. The apparatus of claim 14, wherein the wind redirectors are semi-spherical.

16. The apparatus of claim 14, wherein the wind redirectors are semi-cylindrical.

17. The apparatus of claim 8, further comprising pumps, nozzles, a water storage tank on the assembly of modules, the storage tank having an inlet and a discharge, the inlet connected to the pumps and turbine electric generator connected to the discharge for generating electric power for transmission to land based electric power grids.

18. The apparatus of claim 17, further comprising a valve connected to an outlet of at least one pump for directing water to the nozzles or to the storage tank.

19. A method of using the apparatus of claim 1, the method comprising:

constructing floating modules with hollow structural members, increasing buoyancy of lower submerged members, forming decks on tops of vertical structural members in the modules, joining the modules in assembly of modules by hinged interconnectors.

20. The method of claim 19, further comprising a base of vertical closed hollow members and closed hollow horizontal members interconnected between the vertical hollow members for buoyancy.

21. The method of claim 20, wherein the hollow members are hollow pipes, and the foam filled and sealed buoyant elements, further comprise aligned old tires filled with buoyant material and sealed and encasing the hollow pipes.

22. The method of claim 19, further comprising connecting floating barriers to the structural members at a water line and restricting flow of floating materials such as oil past the barriers.

23. The method of claim 22, further comprising recovering the floating material with equipment on the assembly of modules.

24. The method of claim 21, further comprising:

providing wind redirectors on the assembly of modules, providing windmills on the assembly, providing water pumps on the assembly, providing driving connections between the water pumps and the windmills, providing nozzles on the assembly, connecting the water pumps to the nozzles, and distributing water from the pumps through the nozzles.

25. The method of claim 12, further comprising providing swivels connected to the nozzles and providing fins on the swivels for directing the nozzles with wind forces on the fins.

26. The method of claim 24, providing a floating island from the assembly of modules, further comprising providing multiple levels on the floating island, providing the windmills and pumps on lower levels of the assembly, and providing the nozzles on higher levels on the assembly.

27. The method of claim 24, comprising pumping water from depths with the pumps and distributing the water from the nozzles to reduce surface heat of a body of water on which the apparatus of claim 18 floats.

28. The method of claim 24, further comprising providing underwater nozzles for driving the apparatus of claim 18 in desired directions.

29. The method of claim 24, further comprising providing living, entertainment and exercise facilities on the assembly.

30. The method of claim 29, wherein providing living facilities further comprises providing a boat dock, a helipad, a hotel, a pool, a casino, a water desalinator and a sewage treatment system on the assembly.

31. The method of claim 24, further comprising providing turbine electric generators and creating electrical power with the windmills, the pumps and the generators, and transmitting the electrical power from the assembly to land based electrical power grids.

* * * * *